Patented Aug. 1, 1944

2,354,719

UNITED STATES PATENT OFFICE 2,354,719

PROCESS OF STABILIZING FATTY MATERIALS

Bruno J. Verbeck, Chicago, Ill., assignor to Wilson & Co., Inc., a corporation of Delaware No Drawing. Application January 28, 1942,
Serial No. 428,499

6 Claims. (Cl. 99—163)

This invention relates to methods of treating oleaginous substances for the purpose of stabilizing such substances against oxidation by air. In particular, it relates to the treatment of animal and vegetable fats and oils for the purpose of inhibiting the development of rancidity therein, and to the stabilized fats and oils.

Oxidation of animal and vegetable oils and fats is, in general, indicated by color changes. and an objectionable rancid flavor and odor. In the case of solid fatty materials used for edible purposes, such as lard and shortening, oxidation also usually effects other deleterious changes in the mechanical and chemical properties of the fatty materials. The anti-oxidants hitherto used in these fatty materials to inhibit oxidation have not been wholly satisfactory.

In accordance with my invention, I have found that oxidation in oleaginous substances can be inhibited more satisfactorily than heretofore by treating these substances, particularly animal oils and fats, with a tannin. Any tannin may be used for this purpose, such as tannic acid or the tannins obtained from the barks of the quebracho, oak, sumac, hemlock and like trees. The tannins may be used in any of the commercial forms available. In the case of the tannins other than tannic acid, they may be used in aqueous extract form or in the form of the dried aqueous extract.

These tannins when present in oxidizable fats and oils, even in very small amounts, exhibit a powerful stabilizing action on the fatty materials and greatly improve the keeping properties thereof. Fatty materials which have merely been treated for but a short time with these tannins, say in the order of 5 to 10 minutes, are substantially as stable and have substantially the same keeping qualities as the fatty materials containing the tannins. In consequence, fatty materials of improved stability can be produced without having the objectionable flavor and taste of the anti-oxidant. This is particularly desirable in the case of fats and fatty materials to be used for edible purposes.

In carrying out the present invention, the oil or fat to be stabilized is thoroughly mixed with a small proportion of a tannin in order to effect intimate contact between the oil and the tannin. In the case of fats and other solid oleaginous materials, these are first melted and the tannin then added and mixed therein to effect contact. The oils and the re-solidified fatty materials containing the tannis exhibit a marked stability towards development of rancidity and other objectionable changes. In instances where the presence of the tannin in fatty materials is objectionable, such as in the case of lard, the tannin may be removed from the treated fatty materials in any desirable manner, for example by filtration. Applicant has found that the filtered fatty materials possess substantially the same marked stability against development of rancidity and other objectionable characteristics as the fatty materials containing the tannins. In addition, these treated fatty materials are free from the taste or flavor of the tannins.

If desired, the tannin may be added directly to the fat-containing materials. Thus, in the case of fat-tissue, the tannin may be added thereto prior to rendering. After treatment of the fat-tissue with the tannin, it may be rendered, either by the "steam rendering" process or by the "dry-rendering" process and the tannin may be removed, as by filtration, from the rendered fat. Another alternative method of carrying out my invention is to add a small amount of the tannin to the oil or melted fat and, either before or after removing the tannin therefrom, deodorizing the oil or melted fat by heating it under vacuum to about 400° F. and concurrently passing live steam through it for several hours.

The fatty materials treated in any of the above-mentioned manners or otherwise possess a marked stability toward development of rancidity and the development of other objectionable characteristics in a substantially greater degree than in the case of fatty materials not so treated.

In general, the proportions of a tannin or mixture of tannins which may be used in accordance with the present invention may vary rather widely. In practice, I have found that effective stabilization of fatty materials may be secured by the use of as little as 0.001%. Some stabilization of fatty materials is obtained with the use of even smaller amounts. In many instances, the effect on the fatty materials is progressively enhanced as the amount of tannin used is increased. Usually, a point is reached where the increase in the amount of tannin used does not appreciably enhance the stability of the treated fatty material. I have found that in those cases where the stability of the fatty materials is progressively enhanced by the increase of the amount of tannin used, that the maximum effectiveness is reached by the use of about 3% of the tannin. Larger amounts may, of course, be used, but usually this is wasteful of the material. For most purposes, amounts of tannin in the order of from about 0.005% to 1% accomplish the desired result. My preferred range, however, extends from about 0.005% to 3%.

To illustrate the effectiveness of the tannins in accordance with the present invention, comparative tests were conducted on samples of lard containing 0.5%, 1% and 3% of tannic acid, respectively, and on an untreated control lard sample, using the conventional "active oxygen" procedure. The control sample became rancid in 8½ hours. On the other hand, the sample containing 0.5% of tannic acid remained stable for 38 hours; the sample containing 1% of tannic acid remained stable for 126 hours and the sample containing 3% of tannic acid remained stable for 175 hours. In a similar test carried out with oleo oil, the test portion containing 0.001% of tannic acid remained stable for a 20% longer interval of time than the untreated control portion.

The following are illustrative examples of processes for treating oils and fats in accordance with the present invention. It is to be understood, however, that the present invention is not to be construed as limited to these specific illustrative examples or to the details thereof.

Example I

A portion of oleo oil was divided into a control part and a test part. 0.005% of tannic acid was thoroughly mixed into the test part. Stability of the two oils was then measured by means of the "active oxygen" procedure. The control part became rancid in 8 hours, whereas the test part remained free from rancidity for 15 hours.

Example II

Equal parts of lard were tested by the "active oxygen" procedure. The test part was warmed over a steam bath until melted and 0.1% of tannic acid was thoroughly mixed therewith. The treated test part was then thoroughly filtered. The filtrate was tested for tannic acid and the test was negative. The control portion of the lard became rancid in 6½ hours, whereas the treated test portion remained free from rancidity for 17½ hours.

Example III

A portion of hog fat-tissue was divided into 2 parts. 0.1% of tannic acid was added to the test part. Both parts were then "dry rendered" for 2 hours at 250° F., the resulting fats filtered and then tested as in the above examples. The control fat became rancid in 2½ hours, whereas the treated fat remained free from rancidity for 14½ hours.

Example IV

Hog fat-tissue was divided into two parts and 0.1% of tannic acid was added to the test part. Both parts were "steam rendered" at 15 pounds pressure for two hours, filtered and tested as in the above examples. The control fat became rancid in 5½ hours, whereas the treated fat remained free from rancidity for 13½ hours.

Example V

Refined, deodorized, and bleached cottonseed oil was divided into 2 parts and 1% of tannic acid was added to the test part. The treated test part was then filtered until the filtrate was free from tannic acid and both parts were then tested as in the above examples. The control part became rancid in 14 hours, whereas the test part remained free from rancidity for 22 hours.

The present invention is also applicable to the treatment of oxidizable oils and fats other than those specifically set forth in the illustrative examples, either with tannic acid, a tannin other than tannic acid, or a mixture thereof. Thus, soy bean oil, corn oil, peanut oil, rape seed oil, sesame seed oil, cod-liver oil, other fish oils such as hydrogenated cottonseed oil, mixtures of fats and oils and the like all exhibit a marked stability against development of rancidity when treated in accordance with the present invention, even under the most rigorous conditions encountered in use. Comparative "active oxygen" tests on a control portion of lard and test portions of lard treated with 1% of aqueous quebracho, hemlock, and sumac extracts in accordance with the present invention were carried out. The control portion became rancid in 6 hours. On the other hand, the lard samples containing the aqueous extracts from quebracho, hemlock and sumac remained free from rancidity for 16 hours, 26 hours and 56 hours, respectively.

The fats and oils treated in accordance with the present invention may be used in the same manner as heretofore. Thus, they may be used as an ingredient in the preparation of cakes, cookies, crackers and other bakery products, mayonnaise, salad oils and the like. They may be used alone or in combination with other materials as lubricants, or in the preparation of pharmaceutical salves and the like. In those instances where the presence of the tannin is not objectionable in the final product, the tannin may be left in the fatty material as in Example I. Where it is objectionable, the tannin may be removed from the treated fatty material as in Example II.

By the expression "a tannin" as used in the specification and claims, I refer not only to tannic acid but to the group of astringent, aromatic compounds found in various plants and trees, commonly known as "tannins." These tannins, as is well-known, are acid in character and precipitate alkaloids, mercuric chloride and heavy metals. They form deep blue or black solutions with ferric solution and in strong alkalies absorb oxygen rapidly.

I claim:

1. The process of stabilizing an edible oleaginous substance capable of becoming rancid which comprises admixing said substance while in liquid form with a tannin and thereafter filtering said treated substance to remove a tannin compound.

2. The process of stabilizing edible fats and oils capable of becoming rancid which comprises intimately contacting said fats and oils with tannic acid and thereafter removing a tannic acid compound from said treated fats and oils.

3. The process of stabilizing lard which comprises melting the lard, mixing tannic acid therewith and filtering the treated lard to remove a tannin compound therefrom.

4. The process of stabilizing edible oleo oil which comprises treating the oil with a tannin and filtering a tannin compound from said treated oil.

5. The process of stabilizing lard which comprises contacting the lard while in a liquid state with a tannin and filtering the tannin from the treated lard.

6. The process of stabilizing an edible oleaginous substance capable of becoming rancid which comprises intimately contacting said substance while in liquid form with a tannin and thereafter removing a tannin compound from said treated substance.

BRUNO J. VERBECK.